(No Model.) 2 Sheets—Sheet 1.

J. J. KING.
TRAP.

No. 593,104. Patented Nov. 2, 1897.

WITNESSES:
E. Wolff.
Chas. E. Poensgen.

INVENTOR:
Jeremiah J. King.
BY
Hauff & Hauff
ATTORNEYS.

(No Model.) 2 Sheets—Sheet 2.
J. J. KING.
TRAP.
No. 593,104. Patented Nov. 2, 1897.
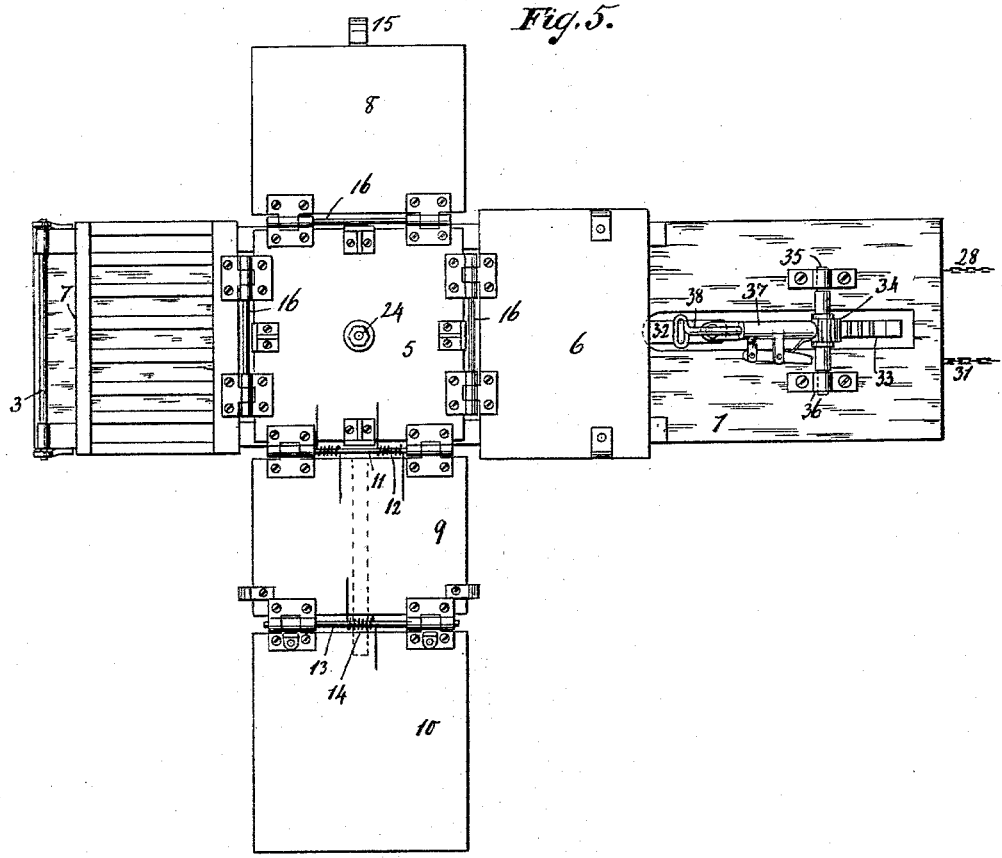
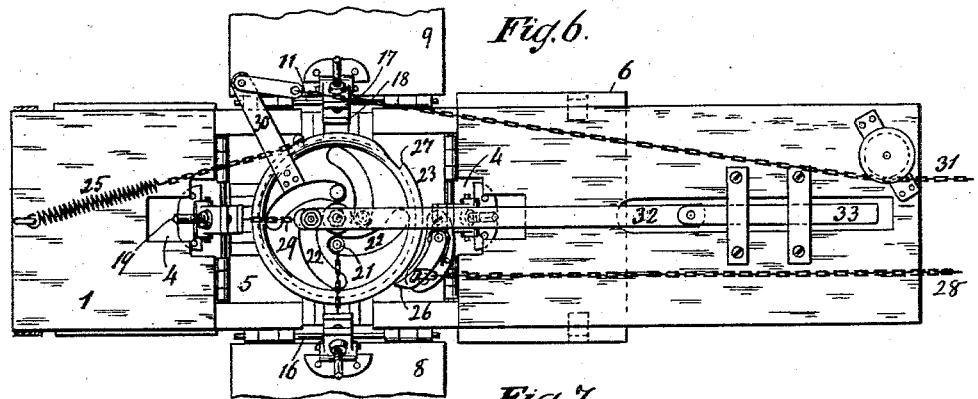
WITNESSES:
E. Wolff
Chas. E. Poensgen
INVENTOR:
Jeremiah J. King
BY
Hauff & Hauff
ATTORNEYS.

UNITED STATES PATENT OFFICE.

JEREMIAH J. KING, OF NEW YORK, N. Y.

TRAP.

SPECIFICATION forming part of Letters Patent No. 593,104, dated November 2, 1897.

Application filed December 5, 1896. Serial No. 614,618. (No model.)

*To all whom it may concern:*

Be it known that I, JEREMIAH J. KING, a citizen of the United States, residing at New York, in the county and State of New York, have invented new and useful Improvements in Traps, of which the following is a specification.

The object of this invention is to provide a trap, such as used in pigeon or bird shooting, which is readily manipulated and which is reliable in operation; and the invention resides in the novel features of construction set forth in the following specification and claims and illustrated in the annexed drawings, in which—

Figure 1:
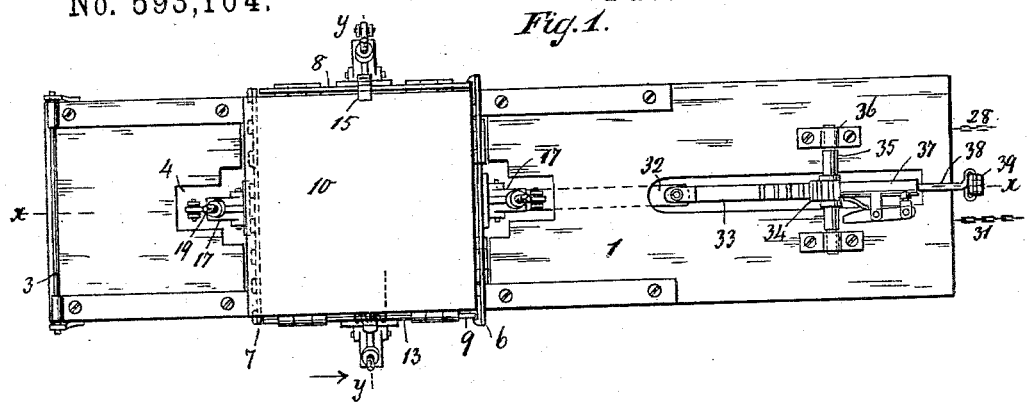
Figure 2:
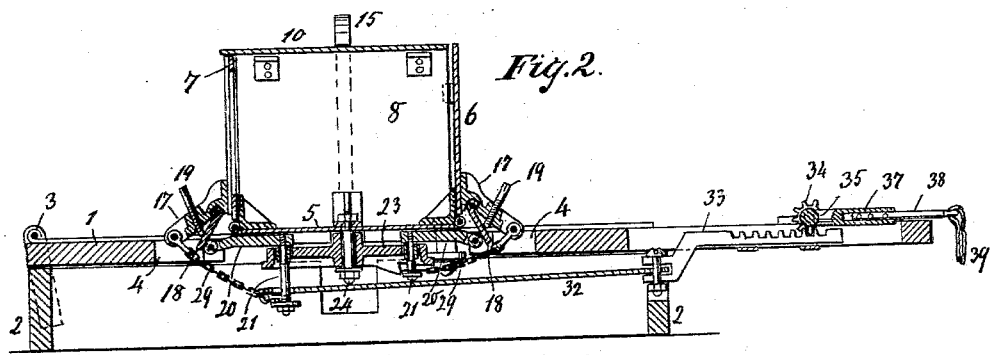
Figure 3:
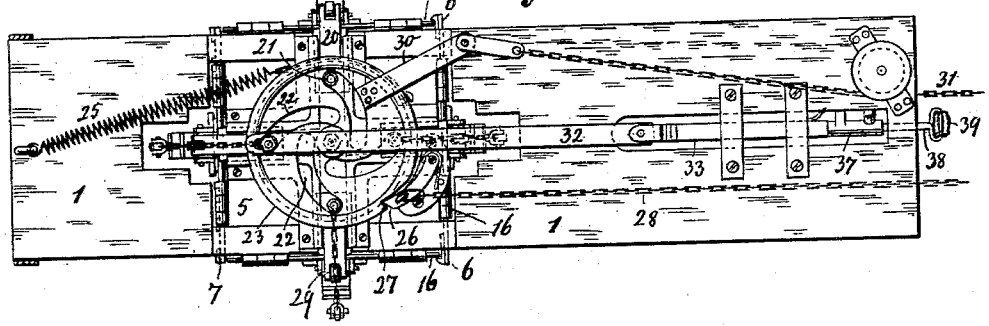
Figure 4:
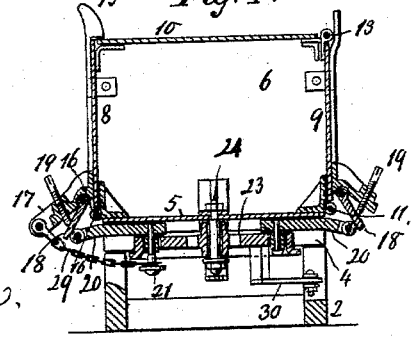

Figure 1 is a plan view of the trap closed. Fig. 2 is a section along $x\ x$, Fig. 1. Fig. 3 is an inverted plan view of Fig. 1. Fig. 4 is a section along $y\ y$, Fig. 1. Fig. 5 is a plan view of the trap open. Fig. 6 is an inverted plan view of Fig. 5. Fig. 7 is a transverse section of Fig. 5.

A base or plate 1 can be practically supported on a box or trough shaped foundation 2 and when hinged or jointed to the foundation, as at 3, the base 1 can be swung or thrown up or back, so as to give access to parts or working mechanism below or at the under side of the base.

The foundation 2, if desired, can be sunk more or less into the earth or into a hollow to bring the board or base 1 toward or level with the floor or ground.

The trap proper may be considered as composed of six sides—namely, the bottom or under side 5, the front side 6, the rear side 7, the lateral sides 8 and 9, and the top side or cover 10.

The side 9 and cover or lid 10 are shown as normally tending to open under the influence of springs or spring-hinges 11 12 and 13 14, Fig. 5. When the trap is closed, the cover or lid 10 can be held shut by a catch 15 on side 8, Fig. 4. The sides 6, 7, and 8 are shown as hinged or jointed at 16, Fig. 5, so as to be capable of opening and shutting or swinging to horizontal or vertical position.

To each side 6, 7, 8, and 9 is fixed an arm or lug 17, carrying a swinging or hinged part 18, which can be adjusted or swung away from lug 17 by set-screw 19. The reciprocating slides 20 have studs 21 entering cam-slots 22, Figs. 3 and 6, in a rotary disk 23, journaled on pivot or bearing 24.

When the slides are moved outward or away from one another to the position shown in Figs. 2 to 4, said slides press on the parts or lips 18, screws 19, and lugs 17, so as to close the sides 6 to 9. The cover or lid 10 remains open under the influence of spring-hinge 13 and 14, so as to allow a bird to be dropped into the trap, after which cover 10 can be pressed shut to be caught or held by catch 15. If after the slides 20 have been brought to the positions shown in Figs. 2 to 4 the sides 6 to 9 or any of them should not be vertical or properly closed, the proper turning of the respective set-screw 19 will adjust such side as required. The motion or play of various parts can be eased by antifriction-rollers to diminish, for example, the friction between slides 20 and lips 18 or between the slide-studs 21 and the edges of cam-slots 22.

The cam-slotted disk 23 is connected to spring 25, tending to move or turn the disk to the position shown in Fig. 6. A spring detent or catch 26 when engaging the disk-shoulder 27, Fig. 3, will hold the disk in the position shown in Fig. 3 against the action of spring 25. When the cord or connection 28 is moved or pulled to withdraw detent 26, the spring 25 moves the disk 23 to the position shown in Fig. 6, whereby the slides are drawn away from lugs 17 and the sides 6 to 9 are left free to drop or open. The side 9, as already noted, tends to open under the action of spring-hinge 11 and 12. The sides 6 to 8 are connected by chains 29 to the slide pins or studs 21, so that the motion of slides 20 away from lugs 17 or toward pivot 24 will cause a pull on chains 29 to open the sides 6 to 8.

Secured to cam or disk 23 is a laterally-projecting arm 30, engaged by chain or connection 31. A pull on chain 31 will move the disk from the position shown in Fig. 6 to that shown in Fig. 3, so as to bring shoulder 27 to position for engagement by detent 26 and to move the slides outward to raise the sides 6 to 9. A pull on chain 31 may be considered a trap-closing pull and a pull on chain 28 an opening or releasing pull.

The lug 17 of side 9, it is noticed, has no chain 29, as such a chain here might interfere with the arm 30.

One of the studs 21 connects by link 32, Fig. 2, with and reciprocates the sliding rack 33, engaging gear 34 of rock-shaft 35, journaled at 36, Fig. 1, on base 1. The shaft 35 carries an arm or sleeve 37, in which can be fixed or adjusted a stem 38 of a starter comprising a rag or flap 39—such, for example, as strips of leather or soft material. On the opening of the trap the arm 37 is swung toward the trap or bottom 5 from the position shown in Fig. 2 to that shown in Fig. 5, so that the motion of flap 39 will start or chase the freed bird to flight.

What I claim as new, and desire to secure by Letters Patent, is—

1. A trap having movable sides, a normally open or spring-actuated cover or closure jointed to one of the sides, mechanism substantially as described for closing the sides while leaving the cover open, and a catch for holding the cover closed substantially as described.

2. A trap having movable sides provided with lugs, slides made to engage the lugs, and an actuator or cam for actuating the slides substantially as described.

3. A trap having movable sides provided with lugs, set-screws for the lugs, slides made to engage the lugs, and an actuator or cam for actuating the slides substantially as described.

4. A trap having movable sides provided with lugs, hinged or swinging portions on said lugs, set-screws made to act upon said hinged portions, slides made to engage said hinged portions, and a cam or actuator for moving the slides substantially as described.

5. A trap having movable sides provided with lugs, slides made to engage the lugs, an actuator or cam for the slides, and chains or connections between the lugs and slides substantially as described.

6. A trap having movable sides provided with lugs, slides made to engage the lugs, an actuator or cam for the slides, and an actuating-spring and detent for the cam substantially as described.

7. A trap having movable sides provided with lugs, slides made to engage the lugs, an actuator or cam for the slides, an actuating-spring and detent for the cam, a withdrawing chain or release for the detent, and a returning chain or connection for moving or setting the cam against the action of the actuating-spring substantially as described.

8. A trap having movable sides provided with lugs, slides made to engage the lugs, an actuator or cam for the slides, a starter or flap, and a slide or rack actuated by the cam for moving the flap substantially as described.

9. A trap having movable sides provided with lugs, slides made to engage the lugs, an actuator or cam for the slides and an actuating-spring and detent for the cam, said cam having a projecting arm for setting or moving the cam against the action of the spring substantially as described.

10. A trap-foundation of a box or trough shape, a base or plate jointed or hinged at one end to said foundation, movable trap portions located on the upper side of the base, and actuating mechanism substantially as described on the under side of the base for opening and closing the trap substantially as described.

In testimony whereof I have hereunto set my hand in the presence of two subscribing witnesses.

JEREMIAH J. KING.

Witnesses:
 WM. C. HAUFF,
 E. F. KASTENHUBER.